United States Patent [19]

Deacon et al.

[11] Patent Number: 5,065,785
[45] Date of Patent: Nov. 19, 1991

[54] STEAM TRAP WITH SEPARATE STEAM AND CONDENSATE INLETS

[75] Inventors: Walter T. Deacon, Schoolcraft, Mich.; Albert V. Vyve, Chaudfontaine, Belgium

[73] Assignee: Armstrong International, Inc., Three Rivers, Mich.

[21] Appl. No.: 573,243

[22] Filed: Aug. 24, 1990

[51] Int. Cl.⁵ .............................................. F16T 1/30
[52] U.S. Cl. .................................................... 137/185
[58] Field of Search ........................................ 137/185

[56] References Cited

U.S. PATENT DOCUMENTS 2,807,276  9/1957  Schulze ................................. 137/185
4,149,557  4/1979  Keech et al. ......................... 137/185

Primary Examiner—Alan Cohan
Attorney, Agent, or Firm—Flynn, Thiel, Boutell & Tanis

[57] ABSTRACT

A steam trap comprises a casing having a condensate and steam inlet port and a condensate outlet port and an inverted bucket capable of rising and falling within the casing. A valve unit is interposed between the inlet port and the interior of the casing and is responsive to the height of the bucket in the casing to open and close. A connection is established from the conduit and steam inlet port to the interior of the inverted bucket and this includes stabilizing structure for allowing steam flow into the upper part of the inverted bucket, unimpeded by condensate flow, for reducing instability of the water level in the bucket, the stabilizing structure including two outlets covered by the bucket, namely a condensate outlet located at first level and a steam outlet located at a second level spaced above the first level.

10 Claims, 3 Drawing Sheets

STEAM TRAP WITH SEPARATE STEAM AND CONDENSATE INLETS

FIELD OF THE INVENTION

This invention relates to an improved inverted bucket steam trap.

BACKGROUND OF THE INVENTION

It is well known to use steam traps to retain steam in a system, while permitting condensate to be removed. One specific type of steam trap is the inverted bucket-type steam trap which has been widely used for controlling the flow of condensate from a steam heated unit to a condensate return line. Such traps are generally used to permit disposal of the condensate while at the same time minimizing the loss of live steam from the steam heated unit. U.S. Pat. No. 4,149,557, assigned to the assignee of the present invention, discloses a successful steam trap of the aforementioned kind.

A problem in prior art inverted bucket steam traps may occur during operation under very low condensate loads. The problem is illustrated with respect to prior art FIG. 6. FIG. 6 shows a prior art inverted bucket steam trap in very simplified schematic form.

Before discussing the aforementioned problem, attention is directed to normal operation of inverted bucket steam traps of which the FIG. 6 prior art trap is an example.

In general, a steam trap 10 (FIG. 6) is typically installed in a drain line 11 between a steam heated unit HU and a condensate return header RH of a steam system. The steam system normally includes a heat source H for converting water to steam and applying it to the steam heated unit HU. The steam heated unit HU extracts heat energy from the steam, reducing a portion of the steam to condensate. The condensate is to be returned to the heat source for reheating to steam. Thus, the steam heated unit HU outputs condensate, normally with some entrained uncondensed steam, applying same on the drain line 11 to the steam trap 10 which is intended to remove the condensate and route it back to the heat source through the condensate return header RH while minimizing loss of steam from the steam heated unit HU.

The mixed steam and condensate is applied to the trap 10 through an inlet conduit 12. The steam trap 10 has a casing 13. An inverted bucket 14 is loosely received in the casing 13 and can rise and fall therein as hereafter described. The inlet conduit 12 has a portion 15 extending into the casing and extending upward into the open bottom of the inverted bucket 14. A restrictive orifice, or vent 16 is provided in the top of the bucket 14 and allows gradual escape of steam from the top portion of the bucket to the top portion of the casing 10. A valve member 17 is pivoted with respect to the casing 13 and is raisable to close a valve seat 20 to close the path from the steam trap 10 to the condensate return header RH. The valve member 17 is connected to, and is closed and opened by, the inverted bucket 14 as it rises and falls within the casing 11.

In normal operation, when the inverted bucket is in its lower most position (below that shown in FIG. 6), the valve 17 is in its lower (open) position not shown, leaving the upper portion of the casing 13 open to the condensate return header RH.

An initial flood of condensate enters the trap 10 through the inlet conduit 12 and flows beneath the lip of the inverted bucket 14 radially outward to fill the casing 13 and completely submerge the inverted bucket 14. Excess condensate is discharged past the open valve member 17 and seat 20 to the condensate return header RH.

When steam enters the trap from the drain line 11 and inlet conduit 12, it collects in the top portion of the inverted bucket 14, imparting buoyancy thereto. Inverted bucket 14 will then rise and lift the valve member 17 toward its seat 20. When the valve member 17 is close to the seat 20, but is still spaced therefrom by a small distance, a further flow of condensate past the valve member 17 and seat 20 toward the condensate return header RH will effect a snapping of the valve member 17 into its closed position shown in FIG. 6. When the valve member 17 closes the seat 20, any air and non-condensable gas trapped in the upper portion of the inverted bucket will gradually pass through the vent 16 therein and collect at the top of the casing 13. Similarly, steam which reaches the upper end of the bucket 14 will gradually flow through the vent 16, such flow being at a slow controlled rate. This steam is eventually condensed by radiation of heat from the steam trap.

Condensate continues to flow into the underside of the bucket through the extension 15 and thence into the trap casing 12. When the condensate level in the steam trap casing 13 reaches a level which is slightly above the floating level for the inverted bucket 14, the inverted bucket will exert a slight pull downward on the valve member 17. However, the valve member 17 will not be moved down to its open position until the condensate level rises to a predefined opening line in the unit for the existing pressure differential between the steam and the pressure in the condensate return header RH. When the condensate reaches this level, the weight of the inverted bucket multiplied by the leverage achieved by the length of its valve member 17 exceeds the pressure holding the valve member 17 in the seating engagement with the valve seat 20. The inverted bucket 14 will then sink and open the valve 17,20 to thereby allow excess condensate to discharge from the casing 13.

However, as above mentioned, a problem occurs when the inverted bucket trap 10 is subjected to very low condensate loads. Under this condition, steam flow is usually impeded by the accumulation of condensate in the low portion of the conduit 12 leading up into the inverted bucket 14. This prevents steam from freely entering the steam trap. In this condition, steam in the inlet conduit 12 tends to push condensate ahead of it in slugs into the steam trap. Such "slug flow" of condensate upsets the water level under the bucket, causing it to be unstable. However, it is such water level under the bucket that controls the opening and closing of the steam trap valve 17,20. As a result, valve operation tends to be unstable, with more rapid than normal opening and closing of the valve 17,20 and a tendency toward incomplete valve opening. This in turn can lead to premature wearing out of the valve 17,20 and premature failure of, and need to replace, the steam trap. It is through recognition of these problems that the present invention arises.

Accordingly, the objects and purposes of the invention include provision of a steam trap capable of cycling effectively on very low condensate loads, in which steam is allowed to enter the trap unimpeded by condensate flow, in which steam moving toward the trap does not tend to push condensate ahead of it in slugs, in which slug flow and consequent upset of the water level under the bucket and resulting instability of the level of the bucket are avoided, and in which these benefits are achieved with relatively little extra structure or cost as compared to the total cost of a conventional steam trap.

SUMMARY OF THE INVENTION

A steam trap comprises a casing having a condensate and steam inlet port and a condensate outlet port and an inverted bucket capable of rising and falling within the casing. A valve unit is interposed between the inlet port and the interior of the casing and is responsive to the height of the bucket in the casing to open and close. A connection is established from the conduit and steam inlet port to the interior of the inverted bucket and this includes stabilizing structure for allowing steam flow into the upper part of the inverted bucket, unimpeded by condensate flow, for reducing instability of the water level in the bucket, the stabilizing structure including two outlets covered by the bucket, namely a condensate outlet located at a first level and a steam outlet located at a second level spaced above the first level.

Further objects and purposes of the invention will be apparent to persons familiar with apparatus of this general type upon reading the following description and viewing the accompanying drawings.

IN THE DRAWINGS

DETAILED DESCRIPTION

Figure 1:
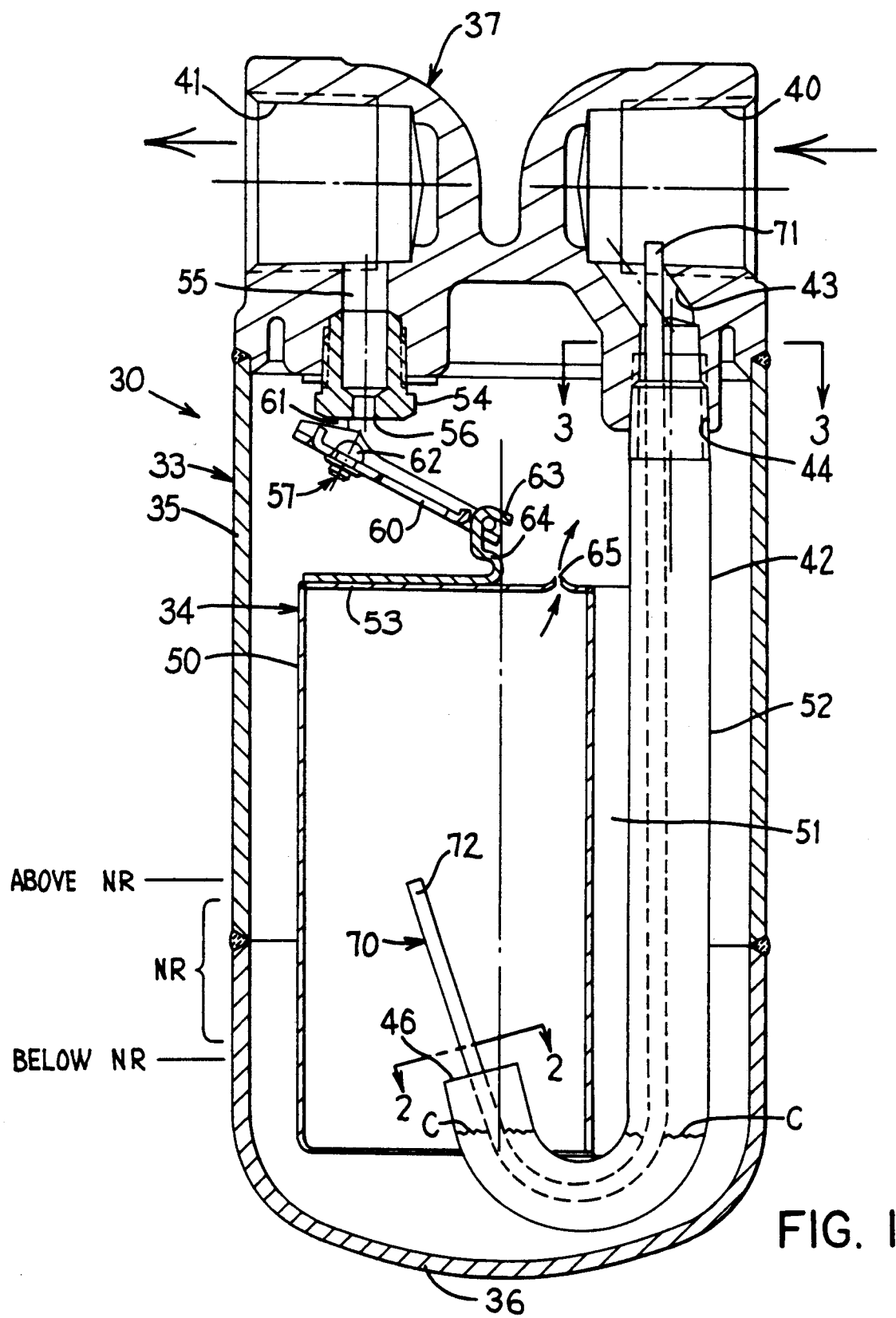
FIG. 1 is a central cross-sectional view, taken in elevation, of a steam trap incorporating a first embodiment of the invention.

Turning to FIG. 1, a steam trap 30 comprises a hollow casing 33 within which is loosely disposed an inverted bucket 34. The casing 33 is here in the form of a deep cup-shaped member defined by a cylindrical side wall 35 and a closed bottom wall 36. The casing further includes a top closure 37 which is fixed atop the side wall 35 and seals the top of the casing 33. In the embodiment shown, the top closure 37 includes a condensate and steam inlet port 40 and a condensate outlet port 41. The ports 40 and 41 accept conventional fittings and, in use, could for example be connected to a steam heated unit HU and condensate return header RH, respectively, such as those shown in prior art FIG. 6 above discussed.

A tube 42 communicates at its upper end through a passage 43 with the inlet port 40. The top of the tube 42 is fixedly secured to and depends from the top closure 37 by means of a rigid connection, for example a threaded connection as seen at 44 in FIG. 1. The tube 42 is substantially J-shaped. More particularly, the bottom portion of the tube 42 curves leftward under the bottom edge of the inverted bucket 34 and then curves upward into the bucket. Thus, the open bottom end 46 of the tube 42 opens upward a short distance into the bucket 34. The tube 42 thus provides an extension of the inlet port 40 into the open underside of the inverted bucket 34.

Figure 5:
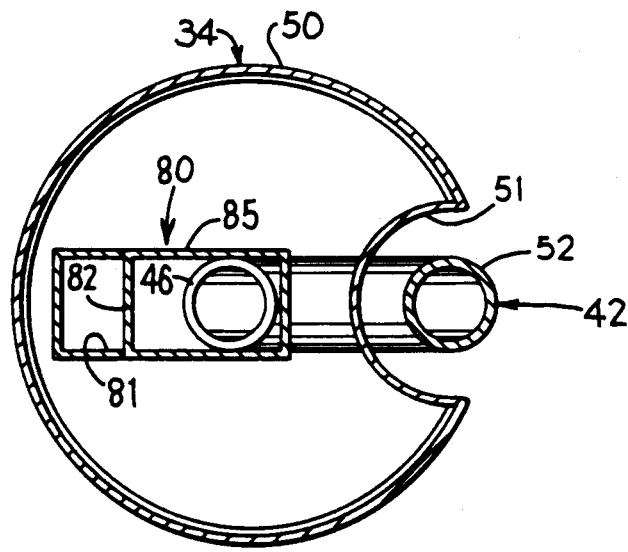
FIG. 5 is a sectional view substantially taken on the line 5—5 of FIG. 4.

In the embodiment shown and as hereinafter discussed with respect to the FIG. 5 embodiment, the inverted bucket 34, while mostly circular in cross section, has its side wall 50 formed with a rightward facing recess 51 which loosely accommodates the upstanding intermediate part 52 of the tube 42. The top of the inverted bucket 34 is closed by a top wall 53 fixed as by welding to the top edge of the side wall 50 allowing the bucket top wall 53 is provided with a vent 65 for steam and non-condensable gases to escape from the top of the bucket to the upper portion of the casing 33.

A hollow member 54 (FIG. 1) is fixed, as by threading, to the under side of the casing top closure 37 and communicates through a short vertical passage 55 with the condensate outlet port 41. The hollow member 54 is provided at its bottom with a valve seat 56.

A valve member 57 includes a lever 60 pivoted loosely on a horizontal axis adjacent its left end by means of a hanger 61 in a conventional manner. A button-like valve element 62 is fixed on the lever 60 close to but inboard of the hanger 61 and beneath the valve seat 56 for pivoting upward into closing contact with the valve seat 56 and alternatively pivoting downward away from the valve seat 56 to open the passage 55 through the valve seat and to the outlet port 41. The rightward, free end of the lever 60 is spaced from the hanger 61 and valve element 62 and is pivotally engaged by a lost motion hook 63 fixedly upstanding from the top wall 53 of the bucket 34. Thus, as the bucket 34 starts to rise from its downwardmost position shown in FIG. 1, the vertical lost motion of the hook 63 is first absorbed. After a short rise of the bucket 34, the bottom 64 of the lost motion hook 63 contacts the rightward end of the lever 60 and begins to pivot it upward. Continued rising of the bucket 34 eventually pivots the valve element 62 upward into contact with the seat 56, closing same with the snap action discussed above with respect to prior art FIG. 6. As the inverted bucket 34 at some time thereafter begins to drop, the vertical lost motion of the hook 63 is consumed. Continued downward displacement of the bucket 34 presses the upper portion of the hook 63 downward against the lever 60 and, when the bucket 34 presses sufficiently downward on the lever 60, it begins to pivot downward, opening the valve 56,62 and re-establishing condensate communication between the interior of the casing 33 and the condensate outlet port 41.

Figure 6:
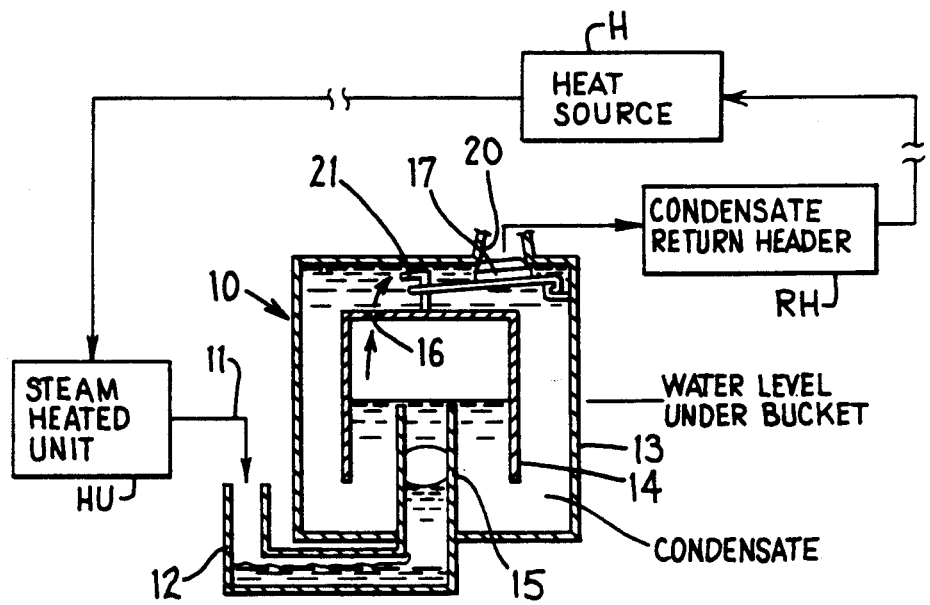
FIG. 6 is a schematic sectional view in elevation of a generalized prior art inverted bucket steam trap and illustrating a problem attacked by the present invention.

To the extent above described, the structure and operation of the steam trap 30 of FIG. 1 is similar to that of prior art FIG. 6 above described.

Turning now more closely to the present invention, a second tube 70 extends from the condensate and steam inlet port 40 down along substantially the same path as the first-mentioned tube 42 and likewise curves under and extends upward into the open bottom of the inverted bucket 34. The second tube 70 is intended to provide a free path for steam from the condensate and steam inlet port 40 into the portion of the inverted bucket which is above water level in the bucket, at least during normal cycling of the apparatus. To this end, the upper (inlet) end 71 of the second tube 70 extends upward partway into the inlet port 40 and ends a distance above the lower surface of the inlet port 40. In one unit constructed according to the invention, the second tube upper end 71 extended up into the inlet port 40 a distance approximating one third the radius of the port 40, and hence a comparable distance above the inlet of the passage 43. The lower (outlet) end 72 of the second tube 70 extends upward into the inverted bucket 34 to a level spaced substantially above the open end 46 of the tube 42. The lower end 72 of the second tube 70 is spaced somewhat above, and the bottom or outlet end 46 of the tube 42 is spaced somewhat below, the normal range of water levels within the inverted bucket 34, i.e., within the range of levels normally occurring normal operation of the apparatus.

In the preferred embodiment shown, the second tube 70 is smaller in diameter than the tube 42, the ratio of the outer diameters of the tubes 42 and 70, in one unit constructed according to the invention, being about five to one. However, such ratio of diameters can vary substantially depending on the relative volumes of steam and condensate to be handled, e.g. from 1.10 to 1 through 10 to 1, typically.

To minimize internal clutter within the steam trap 30, to minimize the opportunity for interference between relatively movable parts, and to allow ready adaptation of the present invention to existing traps or traps of old design but new manufacture, it is preferred that the second tube 70 be housed within the first tube 42, as shown in FIG. 1, and merely extend at its ends beyond the ends of the first tube 42. Assembly can be achieved in any desired way. For example, having formed the outer tube 42 into the J-shape shown in FIG. 1, by conventional means, a second tube 70 of bendable material may be filled with a sealed-in load of non-compressible, flowable material such as sand or the like, or may be filled with a relatively bendable, elongate coiled wire member of conventional kind, and then may be inserted into the J-shaped outer tube 42 and forwarded through the bent lower portion thereof, bending the small diameter tube 70 to match the J-shape contour of the larger diameter outer tube 42, and with the material inside the small tube preventing it from crimping closed at the bend thereof. The material within the smaller tube can then be moved. The small diameter inner tube 70 can then be fixed with respect to the outer tube 42 by any convenient means, such as spot welding at the ends of the large diameter tube 42 to provide the inner/outer tube construction 70,42 as seen in FIG. 1.

OPERATION

Particularly under low condensate loads, it may be possible for condensate to collect in the curved bottom portion of the J-shaped outer tube 42, in a manner generally indicated at C in FIG. 1, and thereby temporarily block normal passage of steam downward through the large diameter tube 42 from the inlet port 40 into the bucket 34, generally in the manner discussed above with respect to prior art FIG. 6. However, in Applicant's FIG. 1 device, it does not matter whether passage of steam through the tube 42 is blocked by a condensate plug, because steam is free to flow from inlet port 40 into the bucket 34 through the second, smaller diameter tube 70. Further, by locating the small tube upper end 71 in spaced relation above the lowermost point in the inlet port 40, and by locating the outlet end 72 of the small diameter tube 70 above the normal water level in the inverted bucket, significant amounts of condensate normally will not find their way into the small diameter tube 70. Any minor amounts of condensate that do find their way into the smaller diameter tube 70 will tend to be readily blown out the outlet end 72 thereof by steam passing through the tube 70 from the inlet port 40 into the bucket 34. Thus, the flow of steam into the bucket 34 is uninterrupted and can be a smooth and continuous flow, free of the pulsing tendency described above with respect to prior art FIG. 6 and thus not contributing to instability in the vertical position of the bucket or erratic or unduly frequent opening and closing of the valve 62,56.

Moreover, under the present invention, slugs of steam cannot become trapped in the tube 42 even at low condensate flow levels, again avoiding the problems with bucket movement and valve opening and closing discussed above.

Further, the outlet of the large diameter tube 42 can be located below the lower end of the normal range of water levels in the inverted bucket 34, so that any unevenness in the inflow of condensate into the trap will be damped by the normal existing layer of water over the outlet end 46 of the large diameter tube 42. This tends to avoid splashing at the water surface within the bucket 34. Further, splashing of water at the in the bucket is further avoided by the substantial reduction or elimination of steam bubbles entering the bucket below the water surface and tending to cause splashing as they break upward through the gas/liquid interface within the bucket 34.

Accordingly, the FIG. 1 invention avoids several sources of unwanted erratic behavior by the bucket 34 and valve 56,62 even under small condensate loads.

Aside from the effects of the inventive structure, the operation of the steam trap 30 is conventional and hence essentially like that described above with respect to prior art FIG. 6 and thus needs no further description.

MODIFICATION

Turning now to the embodiment of FIGS. 4 and 5, the structure and operation are similar to that described above with respect to FIG. 1 except as follows.

Figure 4:
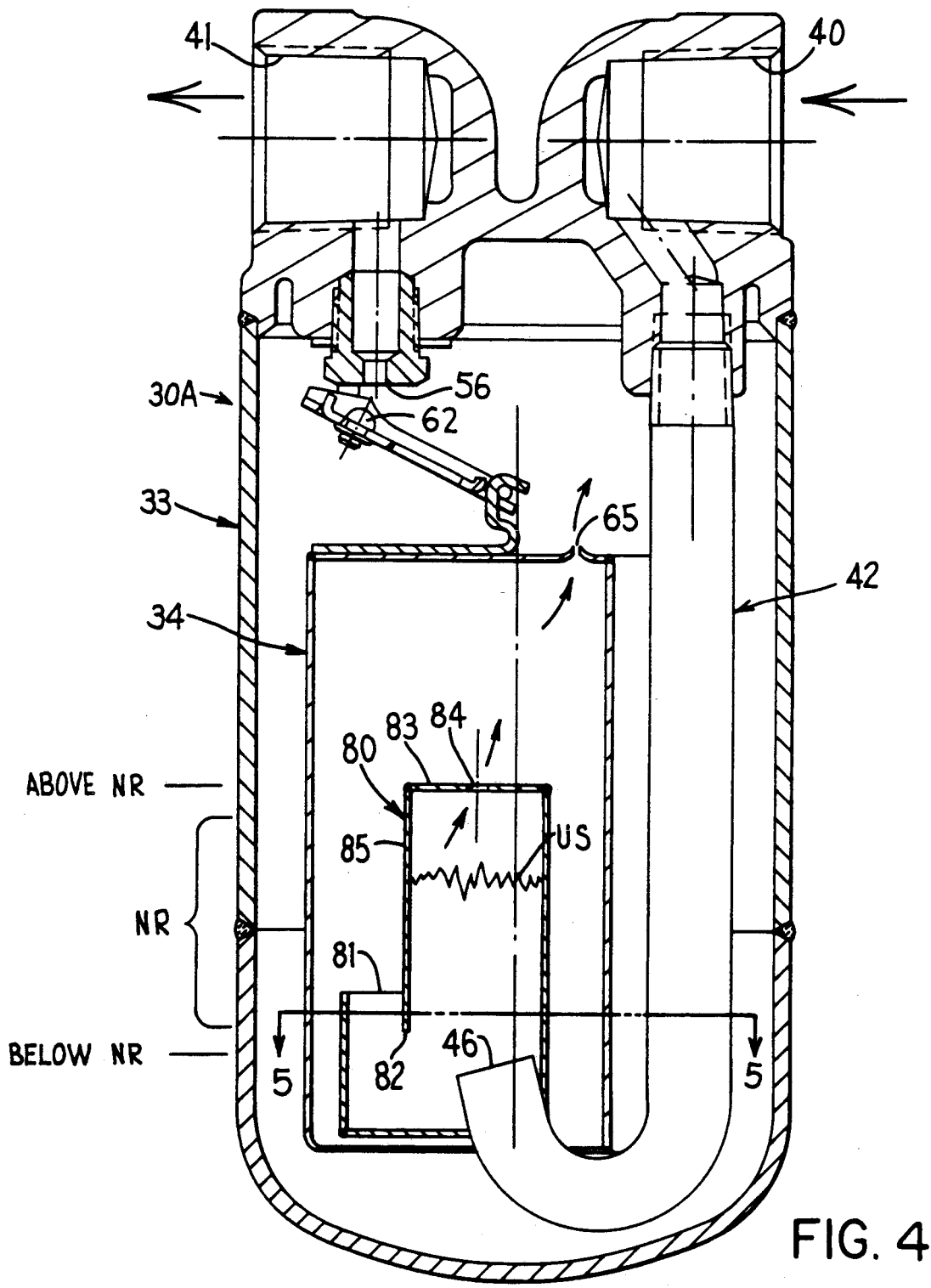
FIG. 4 is a view similar to FIG. 1 but showing a modification.
Figure 2:
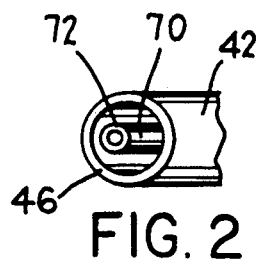
FIG. 2 is a fragmentary sectional view substantially taken on the line 2—2 of FIG. 1.
Figure 3:
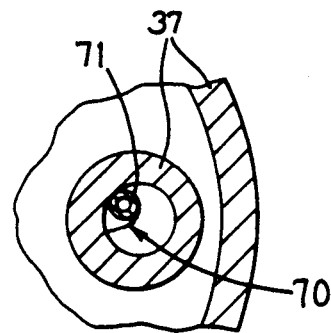
FIG. 3 is a fragmentary sectional view substantially taken on the line 3—3 of FIG. 1.

In the FIG. 4 embodiment, the small diameter tube 70 is eliminated. Instead, an upward extension 80 is located at and above the outlet end of the tube 42. The extension 80 is fixed with respect to the tube 42 and casing 43 of the steam trap 30A. The extension 80 has a relatively large cross section outlet 81 for condensate offset sidewardly (leftwardly in FIG. 4) from the outlet 46 of the tube 42 and separated therefrom by a depending baffle 82. Further, the condensate outlet 81 is located somewhat above the tube outlet 46, somewhat below the normal range NR of water levels in the bucket, and well below closed top 83 of the extension 80. The top 83 of the extension 80 is located above the normal range of water levels in the bucket 34 and thus well above the condensate outlet 81 and the tube outlet 46. The top 83 overlies the tube outlet 46. The top 83 is provided with a steam outlet hole 84 of diameter substantially less than that of the condensate 81.

In normal operation, steam and condensate flow from the condensate and steam inlet port 40 down through the tube 42 and up into the extension 80. Condensate rises in the extension 80 to the level of the condensate outlet 81 and flows out of the condensate outlet into the inverted bucket 34. Steam, on the other hand, rises upward from the tube outlet 46 and exits the extension through the steam outlet 84.

At low condensate flow rates, steam may push condensate ahead of it in slugs. As discussed above with respect to prior art FIG. 6, this action, in a conventional trap, would upset the water level under the bucket causing it to be unstable and therefore destabilizing the operation of the valve 62,56. This instability is eliminated in the FIG. 4 embodiment, as follows. Condensate and slug flow in the tube 42 leaves the tube outlet 46 not directly into the bucket 34 but rather into the extension 80. Splashing and other instabilities in the slug-like flow are confined substantially to the closed, box-like extension 80. Following instabilities in the water surface, in the form of splashing or waves or the like are substantially confined to the relatively tall rightward, chimney-like portion 85 of the extension 80 in a zone spaced below the steam outlet 84 and above the baffle 82. Accordingly, waves, splashing and other instabilities in water level tend to expend their energy within the chimney-like portion 85 of the extension 80. The depending baffle 82 blocks flow to the condensate outlet 81 of water near the unstable surface US in the chimney portion 85 and permits only the relatively calm condensate well below this unstable surface US from reaching the leftward portion of the extension 80 and rising upward and out the condensate outlet 81 into the bucket 34. Thus, condensate flow reaching the interior of the bucket 34 tends to be calm, stable and steady, unlike in the FIG. 6 prior art structure during low condensate loads.

Moreover, steam flow into the bucket 34, from the area in the extension 40 above the unstable surface US is through the relatively small steam outlet hole 84 in the top 83 of the chimney-like upstanding portion 85 of the extension 80 and so is normally not accompanied by significant condensate.

Accordingly, an effect of the extension 80 is to dampen the character of slug-like flow of condensate from the tube 42 before either the steam or the condensate portions of such flow are permitted to enter directly into the bucket 34. The result is to stabilize the operation of the inverted bucket 34 and valve 62,56 despite slug flow of the kind encountered at low condensate levels.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. An inverted bucket steam trap comprising:
   a casing;
   a condensate and steam inlet port and condensate outlet port on said casing;
   an inverted bucket free to float up and down in said casing;
   valve means operatively interposed between said condensate outlet port and the interior of said casing and responsive to elevation of said inverted bucket to a predetermined level in said casing for closing said valve means and further responsive to a drop of said inverted bucket in said casing for opening said valve means;
   means connecting said condensate and steam inlet port to the interior of said inverted bucket and including stabilizing means for allowing steam flow into the upper part of the inverted bucket unimpeded by condensate flow and therewith for reducing instability of water level in said bucket, said stabilizing means having two outlets covered by said bucket, namely
   (1) a condensate outlet at a first level and
   (2) a steam outlet at a second level spaced above said first level;
   said connecting means comprising means defining a first passage from said inlet port to an outlet end in said bucket, said stabilizing means comprising means defining a second passage from said inlet port into said bucket, said means defining said second passage comprising a steam tube extending loosely through said first passage with an outlet end in said bucket above the outlet end of said first passage, said condensate outlet and steam outlet being covered by said bucket and defining the outlet end of said first passage and the outlet end of said steam tube respectively.

2. The apparatus of claim 1 in which the inlet of said tube is above that of said first passage at said inlet port.

3. An inverted bucket steam trap comprising:
   a casing;
   a condensate and steam inlet port and condensate outlet port on said casing;
   an inverted bucket free to float up and down in said casing;
   valve means operatively interposed between said condensate outlet port and the interior of said casing and responsive to elevation of said inverted bucket to a predetermined level in said casing for closing said valve means and further responsive to a drop of said inverted bucket in said casing for opening said valve means;
   means connecting said condensate and steam inlet port to the interior of said inverted bucket and including stabilizing means for allowing steam flow into the upper part of the inverted bucket unimpeded by condensate flow and therewith for reducing instability of water level in said bucket, said stabilizing means having two outlets covered by said bucket, namely
   (1) a condensate outlet at a first level and
   (2) a steam outlet at a second level spaced above said first level;
   said stabilizing means comprising a hollow extension fixed with respect to said casing and disposed in said bucket and communicating with the outlet end of said first passage, said hollow extension having said condensate outlet at said first level and said steam outlet at said second level above said first level.

4. The apparatus of claim 3 in which said hollow extension is an enclosure with an inlet in the bottom thereof, said condensate outlet being part way up the height thereof and said team outlet being at the upper end thereof, said condensate outlet being of substantially wider cross-sectional area than said steam outlet.

5. An inverted bucket steam trap comprising:
   a casing;
   condensate and steam inlet means to said casing and condensate outlet means from said casing;
   a bottom opening inverted bucket free to float up and down in said casing;
   valve means operatively interposed between said condensate outlet means and the interior of said casing and responsive to elevation of said inverted bucket to a predetermined level in said casing for closing said valve means and further responsive to a drop of said inverted bucket in said casing for opening said valve means;

means for directing the condensate and steam from said condensate and steam inlet means upward into the bottom of said inverted bucket, said directing means including condensate surface stabilizing means in said bucket for (1) directing steam upward into the bottom of the inverted bucket past condensate in said bucket while (2) preventing turbulence and splashing of the condensate surface in said bucket by shielding the condensate surface in the bucket from upward steam flow therethrough, said stabilizing means comprising two separate outlets opening in said bucket, namely (1) a condensate outlet at a first level in said bucket and (2) a steam outlet at a second level in said bucket and spaced above said first level.

6. The apparatus of claim 5 in which said directing means is a J-shaped tube, said condensate and steam inlet means being at the top of said casing, said J-shaped tube extending down from said condensate and steam inlet means to below the side of the bucket and then upwardly into the bucket.

7. The apparatus of claim 5 in which the condensate level in said bucket has a normal range, said first level being below said range to reduce splash as condensate enters the bucket, the second level being above said range to eliminate blocking of steam flow into the bucket by condensate in the bucket.

8. The apparatus of claim 5 in which said stabilizing means includes means defining a condensate passage continuing said directing means upward in said bucket and opening into said bucket through said condensate outlet at said first level for flowing condensate into said bucket, and means defining a steam passage continuing said directing means upward in said bucket beyond said condensate passage and opening into said bucket through said steam outlet at said second level.

9. The apparatus of claim 5 in which the top portion of said bucket has means for allowing leaking of gas from said bucket but only into said casing and for escape from said casing only through said valve means upon opening of said valve means.

10. The apparatus of claim 5 in which the upper part of said bucket is closed to said condensate and steam inlet means and said bucket is closed to said condensate and steam inlet means except through the bottom of said bucket.

* * * * *

UNITED STATES PATENT AND TRADEMARK OFFICE
CERTIFICATE OF CORRECTION

PATENT NO.　：　5 065 785
DATED　　　：　November 19, 1991
INVENTOR(S)：　Walter T. DEACON et al It is certified that error appears in the above-identified patent and that said Letters Patent is hereby corrected as shown below:

On the title page, item [75], change inventor "Albert V. Vyve" to ---Albert Van Vyve---.

Column 6, line 23; after "at the" insert ---liquid surface---.

Column 8, line 55; change "team" to ---steam---.

Signed and Sealed this

Twenty-first Day of September, 1993

Attest:

BRUCE LEHMAN

Attesting Officer　　Commissioner of Patents and Trademarks